United States Patent
Miwa et al.

(10) Patent No.: US 11,526,837 B2
(45) Date of Patent: Dec. 13, 2022

(54) DELIVERY SYSTEM, DELIVERY METHOD, AND COMPUTER-READABLE NON-TRANSITORY RECORDING MEDIUM STORING A PROGRAM

(71) Applicant: HONDA MOTOR CO., LTD., Tokyo (JP)

(72) Inventors: Satoshi Miwa, Wako (JP); Satoshi Onodera, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 371 days.

(21) Appl. No.: 16/824,060

(22) Filed: Mar. 19, 2020

(65) Prior Publication Data
US 2020/0300659 A1 Sep. 24, 2020

(30) Foreign Application Priority Data
Mar. 20, 2019 (JP) .............................. JP2019-052509

(51) Int. Cl.
| | | |
|---|---|---|
| G01C 21/36 | (2006.01) |
| G06Q 10/08 | (2012.01) |
| G01W 1/14 | (2006.01) |
| G06Q 50/30 | (2012.01) |
| G01C 21/34 | (2006.01) |
| G05D 1/00 | (2006.01) |

(52) U.S. Cl.
CPC ... *G06Q 10/08355* (2013.01); *G01C 21/3691* (2013.01); *G01W 1/14* (2013.01); *G05D 1/0088* (2013.01); *G06Q 50/30* (2013.01); *G01C 21/3415* (2013.01)

(58) Field of Classification Search
CPC ............ G06Q 10/08355; G06Q 50/30; G06Q 10/0832; G01C 21/3691; G01C 21/3415; G01W 1/14; G01W 1/10; G05D 1/0088; B64D 1/02
See application file for complete search history.

(56) References Cited

U.S. PATENT DOCUMENTS 9,536,216 B1 * 1/2017 Lisso .................. G01C 21/00
9,959,771 B1 * 5/2018 Carlson ............... G08G 5/0039
11,120,391 B1 * 9/2021 Lisso .................... G01S 19/13

FOREIGN PATENT DOCUMENTS

JP 2018-097444 A 6/2018
JP 2018-165205 A 10/2018

* cited by examiner

*Primary Examiner* — Brian P Sweeney
(74) *Attorney, Agent, or Firm* — Carrier Blackman & Associates, P.C.; Joseph P. Carrier; Fulchand P. Shende

(57) ABSTRACT

A delivery system for delivering a package to a delivery destination using a moving body, including a weather information acquiring unit that acquires weather information including information concerning weather at the delivery destination; and a judging unit that judges whether delivery of the package to the delivery destination by the moving body is possible, based on the weather information acquired by the weather information acquiring unit.

12 Claims, 5 Drawing Sheets

DELIVERY SYSTEM, DELIVERY METHOD, AND COMPUTER-READABLE NON-TRANSITORY RECORDING MEDIUM STORING A PROGRAM

CROSS-REFERENCE TO RELATED APPLICATION

This application is based upon and claims the benefit of priority from Japanese Patent Application No. 2019-052509 filed on Mar. 20, 2019, the contents of which are incorporated herein by reference.

BACKGROUND OF THE INVENTION

Field of the Invention

The present invention relates to a delivery system, a delivery method, and a computer-readable non-transitory recording medium storing a program.

Description of the Related Art

Japanese Laid-Open Patent Publication No. 2018-165205 discloses a delivery system for delivering a package from a delivery source to a vehicle of a recipient, using an unmanned flying body. According to the delivery system of Japanese Laid-Open Patent Publication No. 2018-165205, the unmanned flying body is caused to fly toward the vehicle based on position information of the vehicle. The unmanned flying body lowers the package into the vehicle compartment when a door of the vehicle is opened.

SUMMARY OF THE INVENTION

However, with the technology described in Japanese Laid-Open Patent Publication No. 2018-165205, the delivery cannot always be performed favorably.

It is an object of the present invention to provide a delivery system, a delivery method, and a computer-readable non-transitory recording medium storing thereon a program that make it possible to favorably deliver a package to a delivery destination.

A delivery system according to one aspect of the present invention is a delivery system for delivering a package to a delivery destination using a moving body, comprising a weather information acquiring unit that acquires weather information including information concerning weather at the delivery destination; and a judging unit that judges whether delivery of the package to the delivery destination by the moving body is possible, based on the weather information acquired by the weather information acquiring unit.

A delivery method according to another aspect of the present invention comprises a step of acquiring weather information including information concerning weather at a delivery destination; and a step of judging whether delivery of a package to the delivery destination by a moving body is possible, based on the weather information.

According to yet another aspect of the present invention, a computer-readable non-transitory recording medium stores thereon a program that causes a computer to perform a step of acquiring weather information including information concerning weather at a delivery destination; and a step of judging whether delivery of a package to the delivery destination by a moving body is possible, based on the weather information.

According to the present invention, it is possible to provide a delivery system, a delivery method, and a computer-readable non-transitory recording medium storing thereon a program that make it possible to favorably deliver a package to a delivery destination.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of a delivery system, a delivery method, and a computer-readable non-transitory recording medium storing thereon a program according to the present invention, while referencing the accompanying drawings.

One Embodiment

Figure 1:
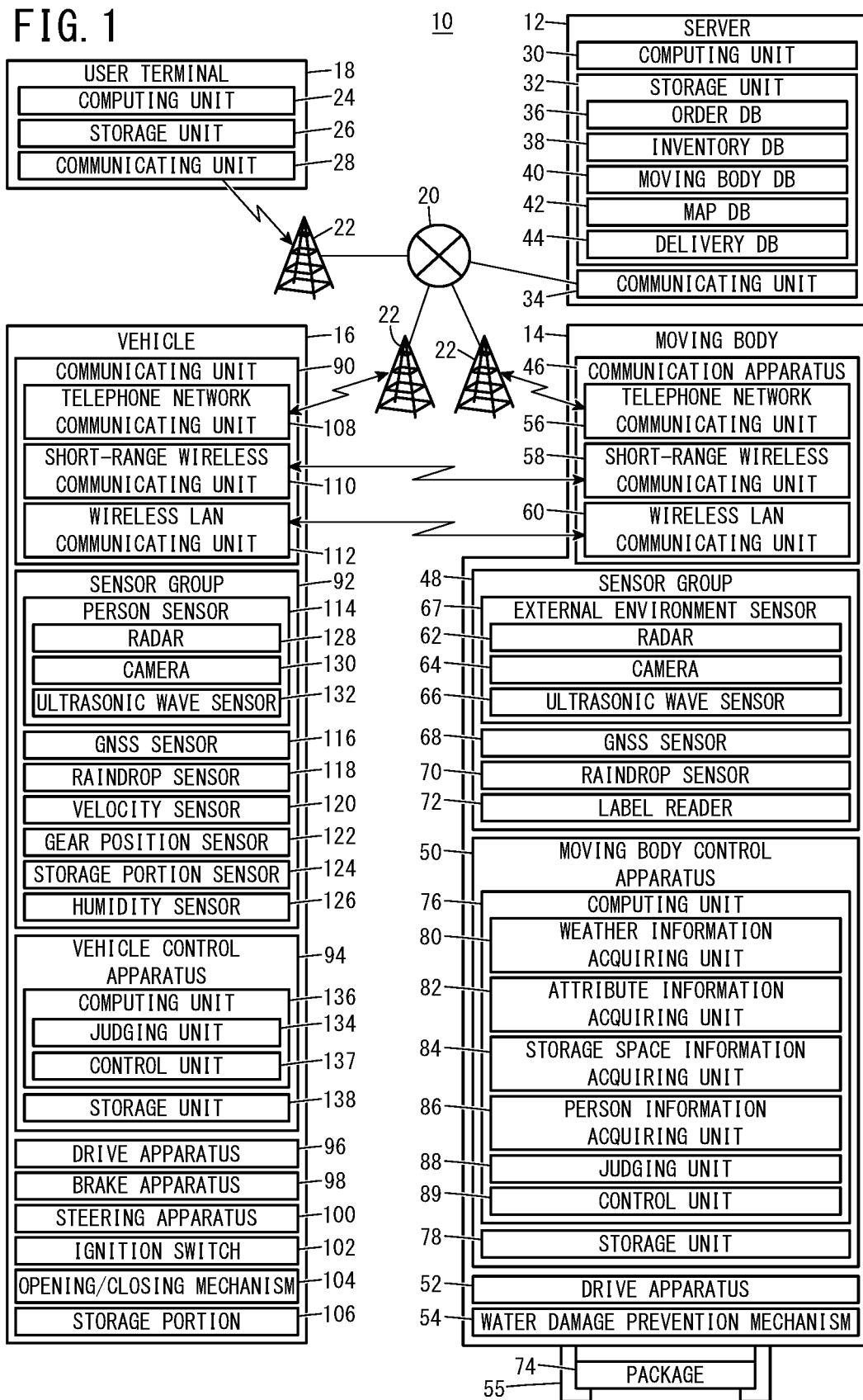
FIG. 1 is a block diagram of a delivery system according to an embodiment.

The following describes a delivery system, a delivery method, and a computer-readable non-transitory recording medium storing thereon a program according to one embodiment, using the drawings. FIG. 1 is a block diagram showing the delivery system according to the present embodiment.

The delivery system 10 according to the present embodiment can be formed by a server (service management server or service server) 12, a moving body 14, a vehicle 16, and a user terminal 18, but is not limited to this. Here, an example is described of a case in which the moving body 14 is an autonomous flying body (drone), but the present invention is not limited to this.

With the delivery system 10 according to the present embodiment, a user (customer) manipulates the user terminal (customer terminal) 18 to order a product (not shown in the drawings). The server 12 instructs the moving body 14 to deliver a package 74 including this product, based on the order information supplied from the user terminal 18. The moving body 14 delivers the package 74 to the delivery destination, based on the instructions from the server 12. Here, an example is described of a case in which the delivery destination is the vehicle 16, but the present invention is not limited to this.

The user terminal 18 and the server 12 can communicate via a network (communication network) 20 or the like. The network 20 is an Internet communication network or the like, for example, but is not limited to this. FIG. 1 shows an example of a case in which the user terminal 18 is a mobile terminal. In the case where the user terminal 18 is a mobile terminal, the user terminal 18 and the server 12 can communicate via a wireless relay station 22 and the network 20.

In a case where the user terminal 18 is a stationary terminal, the user terminal 18 and the server 12 can communicate via the network 20.

The server 12 and the moving body 14 can communicate via the network 20 and the wireless relay station 22. The server 12 and the vehicle 16 can communicate via the network 20 and the wireless relay station 22.

The moving body 14 and the vehicle 16 can communicate via the wireless relay station 22 and the network 20. Furthermore, the moving body 14 and the vehicle 16 can perform short-range wireless communication. Examples of this short-range communication include short-range communication based on a Bluetooth (Registered Trademark) standard or the like. Furthermore, the moving body 14 and the vehicle 16 can communicate using a wireless LAN (Local Area Network), for example. More specifically, the moving body 14 and the vehicle 16 can perform wireless communication based on a Wi-Fi (registered Trademark) standard or the like, for example.

The moving body 14 and the user terminal 18 can communicate via the wireless relay station 22 and the network 20. Furthermore, the vehicle 16 and the user terminal 18 can communicate via the wireless relay station 22 and the network 20.

As described above, the user can order a product by manipulating the user terminal 18. The user terminal 18 is a mobile communication terminal, for example. Examples of a mobile communication terminal include a smartphone and the like, but the mobile communication terminal is not limited to this. As described above, the user terminal 18 is not limited to being a mobile communication terminal, and may instead be a stationary terminal. Examples of a stationary terminal include a personal computer and the like, but the stationary terminal is not limited to this. The user terminal 18 includes a computing unit 24, a storage unit 26, and a communicating unit 28. The user terminal 18 can also include other configurational elements, but descriptions thereof are omitted.

The server 12 can perform order management, inventory management, delivery management, and the like. The server 12 can be managed by a business or the like, for example, but is not limited to this. For the order management, the server 12 receives orders for products from users, for example. For the inventory management, the server 12 performs inventory management of products. For the delivery management, the server 12 manages the delivery of packages 74 using the moving body 14. The server 12 includes a computing unit 30, a storage unit 32, and a communicating unit 34. The server 12 can also include other configurational elements, but descriptions thereof are omitted.

The computing unit 30 performs overall control of the server 12. The computing unit 30 can be formed by a CPU (Central Processing Unit), an ASIC (Application Specific Integrated Circuit), or the like, for example, but is not limited to this.

The storage unit 32 includes a volatile memory (not shown in the drawings) and a non-volatile memory (not shown in the drawings). The volatile memory is a RAM (Random Access Memory) or the like, for example. The non-volatile memory is a ROM (Read Only Memory), a flash memory, or the like, for example. Programs, data and the like are stored in the storage unit 32.

The storage unit 32 includes an order database (order DB) 36, an inventory database (inventory DB 38), a moving body database (moving body DB) 40, a map database (map DB) 42, and a delivery database (delivery DB) 44. Information concerning orders, i.e. order information, can be accumulated in the order database 36. As described above, ordering of a product can be performed by having the user manipulate the user terminal 18. Information concerning product inventory, i.e. inventory information, can be accumulated in the inventory database 38. Individual information or the like concerning a moving body 14 to be used to deliver a package 74 can be accumulated in the moving body database 40. This individual information can include identification information (identification ID) of the moving body 14, the type (drone or the like) of the moving body 14, the maximum loading weight of the moving body 14, the maximum dimensions of a package 74 that can be loaded in the moving body 14, and the like, for example. Furthermore, this individual information can include fuel consumption of the moving body 14, maximum velocity of the moving body 14, number of operational years of the moving body 14, total distance travelled by the moving body 14, number of packages 74 that can be loaded in the moving body 14, the current position of the moving body 14, and the like. Map information for performing the delivery with the moving body 14 and the like can be accumulated in the map database 42. Information concerning the delivery of a package 74 including a product for which an order has been received, i.e. delivery information, can be accumulated in the delivery database 44. The delivery information can also include information concerning the moving body 14 that is to deliver the package 74.

The communicating unit 34 can communicate with the user terminal 18, the moving body 14, the vehicle 16, and the like via the network 20 and the wireless relay station 22.

The moving body 14 can be used to deliver the package 74 to the delivery destination, for example. The moving body 14 delivers the package 74 from the delivery source to the delivery destination, based on the delivery instructions (flight instructions) transmitted from the server 12 to the moving body 14. The delivery source is a warehouse (not shown in the drawings), for example, but is not limited to this. The delivery destination is the vehicle 16, for example, but is not limited to this.

The moving body 14 includes a communication apparatus (communicating unit) 46, a sensor group 48, a moving body control apparatus 50, a drive apparatus (propeller driving section) 52, a water damage prevention mechanism 54, and a holding mechanism 55. The moving body 14 can also include other configurational elements, but descriptions thereof are omitted.

The communication apparatus 46 includes a telephone network communicating unit 56, a short-range wireless communicating unit 58, and a wireless LAN communicating unit 60. The telephone network communicating unit 56 includes a communication module (not shown in the drawings) that can be adapted to a mobile telephone network. The telephone network communicating unit 56 can communicate via the telephone network. The short-range wireless communicating unit 58 includes a short-range wireless communication module (not shown in the drawings). A communication module adapted to the Bluetooth (Registered Trademark) standard can be used as the short-range wireless communication module. The short-range wireless communicating unit 58 can perform short-range wireless communication with a short-range wireless communicating unit 110 included in the vehicle 16. The wireless LAN communicating unit 60 includes a wireless LAN module (not shown in the drawings). A module adapted to the Wi-Fi (Registered Trademark) standard can be used as the wireless LAN module. The wireless LAN communicating unit 60 can perform wireless communication with a wireless LAN communicating unit 112 included in the vehicle 16.

The sensor group 48 can include an external environment sensor 67, a GNSS (Global Navigation Satellite System) sensor 68, a raindrop sensor 70, and a label reader 72.

The external environment sensor 67 can include a radar 62, a camera 64, and an ultrasonic wave sensor 66.

The radar 62 emits a transmission wave toward a target object and receives a reflected wave resulting from the target object reflecting back the emitted transmission wave. The transmission wave is an electromagnetic wave or the like, for example. The electromagnetic wave is a millimeter wave or the like, for example. The target object is a vehicle 16, a person (not shown in the drawings), or the like, for example, but is not limited to this. The radar 62 generates radar information (reflected wave signal) based on the reflected wave and the like. The radar 62 supplies the moving body control apparatus 50 with the generated radar information. One radar 62 is shown in FIG. 1, but the moving body 14 actually includes a plurality of radars 62. The radar 62 is not limited to being a millimeter wave radar. For example, a laser radar or the like may be used as the radar 62.

The camera (imaging section) 64 can capture an image of the surroundings of the moving body 14. A camera capable of acquiring three-dimensional information, for example, can be used as the camera 64. The information acquired by the camera 64, i.e. the camera information, is supplied from the camera 64 to the moving body control apparatus 50. One camera 64 is shown in FIG. 1, but a plurality of cameras 64 are actually included. The orientation of the camera 64 can be adjusted by an actuator (not shown in the drawings).

The ultrasonic wave sensor 66 emits an ultrasonic wave toward the target object, and receives a reflected wave resulting from the target object reflecting back the emitted transmission wave. The ultrasonic wave sensor 66 can detect the presence or lack of a target object, the distance to the target object, and the like. The ultrasonic wave sensor 66 generates ultrasonic wave sensor information based on the reflected wave and the like. The ultrasonic wave sensor 66 supplies the generated ultrasonic wave sensor information to the moving body control apparatus 50. One ultrasonic wave sensor 66 is shown in FIG. 1, but the moving body 14 actually includes a plurality of ultrasonic wave sensors 66.

The external environment information can be formed by the radar information acquired by the radar 62, the camera information acquired by the camera 64, and the ultrasonic wave sensor information acquired by the ultrasonic wave sensor 66, but is not limited to this.

The GNSS sensor 68 can detect the current position of the moving body 14. The information acquired by the GNSS sensor 68, i.e. the information indicating the current position of the moving body 14 (moving body position information), is supplied to the moving body control apparatus 50.

The raindrop sensor 70 detects the presence or lack of raindrops, and outputs a signal indicating the detection result to the moving body control apparatus 50. A raindrop sensor that detects the presence or lack of raindrops by detecting a change in electrostatic capacitance caused by raindrops falling between a pair of electrodes, for example, can be used as the raindrop sensor 70, but the raindrop sensor 70 is not limited to this.

The label reader 72 can read information recorded on a label (not shown in the drawings) attached to the package 74. This label is a label or the like on which information such as an address (e.g. to the compartment of the vehicle 16 or the like) or a barcode is recorded, but is not limited to this. The label reader 72 includes a lighting section (not shown in the drawings), a camera (not shown in the drawings), and a barcode reader (not shown in the drawings). The label reader 72 radiates light onto the package 74 using the lighting section, and captures an image of the label using the camera. The image acquired by capturing an image of the label is supplied to the barcode reader. The barcode reader acquires the information recorded on the label, based on this image. The information acquired by the barcode reader can be supplied to the moving body control apparatus 50.

The sensor group 48 can further include a speedometer (not shown in the drawings), an altimeter (not shown in the drawings), and a gyro sensor (not shown in the drawings). The speedometer can detect the movement velocity of the moving body 14, more specifically the flight velocity. The altimeter can detect the distance from the ground positioned below the moving body 14 to the moving body 14, i.e. the ground altitude (altitude). The gyro sensor can detect the angular velocity of the moving body 14. The angular velocity includes the angular velocity relative to an up-down axis (yaw), the angular velocity relative to a left-right axis (pitch), and the angular velocity relative to a front-rear axis (roll).

The moving body control apparatus 50 performs overall control of the moving body 14. The moving body control apparatus 50 causes the moving body 14 to move (fly) autonomously from a departure location (delivery source) to a target location (delivery destination).

The moving body control apparatus 50 includes a computing unit 76 and a storage unit 78. The computing unit 76 performs overall control of the moving body control apparatus 50. The computing unit 76 can be formed by a CPU, an ASIC, or the like, for example, but is not limited to this. The computing unit 76 controls the moving body 14 by controlling each section based on a program stored in the storage unit 78.

The computing unit 76 includes a weather information acquiring unit 80, an attribute information acquiring unit 82, a storage space information acquiring unit 84, a person information acquiring unit 86, a judging unit 88, and a control unit 89. The weather information acquiring unit 80, the attribute information acquiring unit 82, the storage space information acquiring unit 84, the person information acquiring unit 86, the judging unit 88, and the control unit 89 can be realized by having the computing unit 76 execute the program stored in the storage unit 78.

The storage unit 78 includes a volatile memory (not shown in the drawings) and a non-volatile memory (not shown in the drawings). The volatile memory is a RAM or the like, for example. The non-volatile memory is a ROM, a flash memory, or the like, for example. Weather information, attribute information, storage space information, person information, and the like are stored in the volatile memory, for example. Programs, tables, maps, and the like are stored in the non-volatile memory, for example.

The weather information acquiring unit 80 acquires the weather information. The weather information includes information concerning the weather at the delivery destination. In a case where the delivery destination is the vehicle 16, the weather information acquiring unit 80 acquires weather information at the location of the vehicle 16. This weather information can be obtained using a raindrop sensor 118 or the like included at the delivery destination, for example. In a case where the delivery destination is the vehicle 16, the weather information can be acquired using the raindrop sensor 118 included in the vehicle 16, for example. The weather information is not limited to information acquired by the raindrop sensor 118. For example, the weather information may be acquired based on meteorological information (meteorological data) and position information indicating the position of the delivery destination. The meteorological information may be meteorological information provided by a public agency or may be meteorological information provided by a private business or the like, for example. The weather information can further include information concerning the weather along the delivery route, but is not limited to this. The judging unit 88 can judge whether delivery of the package 74 to the delivery destination by the moving body 14 is possible, based on the weather information acquired by the weather information acquiring unit 80. At the stage where the moving body 14 has reached an area near the delivery destination, the weather information can be acquired by the raindrop sensor 70 and the like included in the moving body 14. The weather information acquiring unit 80 also acquires the weather information at the location of the moving body 14. This weather information can be acquired by the raindrop sensor 70 included in the moving body 14, for example.

The attribute information acquiring unit 82 can acquire the attribute information, which is information concerning an attribute of the package 74. The attribute information can include information concerning the presence or lack of waterproofing measures for the package 74. The information concerning the presence or lack of waterproofing measures for the package 74 is information indicating whether the package 74 is waterproof, for example. The judging unit 88 can judge whether delivery of the package 74 to the delivery destination by the moving body 14 is possible, further based on the attribute information acquired by the attribute information acquiring unit 82. The judging unit 88 can judge whether delivery of the package 74 to the delivery destination by the moving body 14 is possible, based on whether waterproofing measures have been implemented for the package 74. The information concerning the presence or lack of waterproofing measures for the package 74 is stored in advance in the server 12, for example. The attribute information acquiring unit 82 can make a request to the server 12 for the information concerning the presence or lack of waterproofing measures for the package 74. The information concerning the presence or lack of waterproofing measures for the package 74 may be read from the label attached to the package 74, for example.

The storage space information acquiring unit (storage portion information acquiring unit) 84 can acquire the storage space information. The storage space information is information concerning the storage space (empty space) in a storage portion 106 included in the delivery destination. The judging unit 88 can judge whether to deliver (transport) the package 74 to the storage portion 106 with the moving body 14, based on the storage space information acquired by the storage space information acquiring unit 84. In a case where the delivery destination is the vehicle 16, the storage portion 106 is a trunk provided in the vehicle 16, for example. In such a case, the storage space is the empty space in the trunk, for example. The storage portion 106 is not limited to being a trunk in the vehicle 16. The storage portion 106 may be inside the vehicle compartment (not shown in the drawings). In such a case, the storage space is an empty space within the vehicle compartment, for example. Here, an example is described of a case in which the storage portion 106 is provided in the vehicle 16, but the present invention is not limited to this. For example, the storage portion 106 may be a delivery box (not shown in the drawings). In such a case, the storage space is the empty space in the delivery box.

The storage space information acquired by the storage space information acquiring unit 84 can include information concerning the size of the storage space. If no items are stored in the storage portion 106, the size of the storage space is equivalent to the storage size of the storage portion 106. The storage size of the storage portion 106 is the size of the inside of the storage portion 106 in a state where the storage portion 106 is empty. If there is a stored item inside the storage portion 106, the storage space is decreased due to this stored item. Accordingly, if a stored item is present within the storage portion 106, the size of the storage space is less than that of the storage portion 106. If a stored item is present within the storage portion 106, the empty space on one side or another side of this stored item can be the storage space. The judging unit 88 can judge whether delivery of the package 74 to the storage portion 106 is possible based on the size of the package 74, i.e. the external dimensions of the package 74, and the size of the storage space. The information concerning the size of the storage space within the storage portion 106 can be acquired by a storage portion sensor 124 included in the vehicle 16. The control unit 89 included in the moving body 14 can make a request to the vehicle 16 to provide the information concerning the size of the storage space. Here, an example is described of a case in which the information concerning the size of the storage space is acquired by the storage portion sensor 124 included in the vehicle 16, but the present invention is not limited to this. For example, the information concerning the size of the storage space can be acquired using the external environment sensor 67 included in the moving body 14, in a state where a door (not shown in the drawings) to the storage portion 106 is open.

The storage space information acquired by the storage space information acquiring unit 84 can include information concerning the presence or lack of waterproofing measures for the storage portion 106. The judging unit 88 can judge whether delivery of the package 74 to the storage portion 106 by the moving body 14 is possible, further based on whether waterproofing measures have been implemented for the storage portion 106. For example, if it is raining at the location of the storage portion 106 and waterproofing measures have not been implemented for the storage portion 106, the judging unit 88 can judge that the delivery of the package 74 to the storage portion 106 is impossible. It should be noted that, even in such a case, if the user permits the delivery of the package 74 to the storage portion 106, the judging unit 88 can judge that the delivery of the package 74 to the storage portion 106 is possible. The permission for the delivery of the package 74 to the storage portion 106 when the weather is rainy can be performed by having the moving body 14 make an inquiry to the user, for example. The permission for the delivery of the package 74 to the storage portion 106 when the weather is rainy may be performed by the user when ordering the product or the like, for example. The information concerning waterproofing measures for the storage portion 106 can be stored in advance in a storage unit 138 included in a vehicle control apparatus 94. The control unit 89 included in the moving body 14 can make a request to the vehicle 16 to provide the information concerning the waterproofing measures for the storage portion 106.

The storage space information acquired by the storage space information acquiring unit 84 can include information concerning the dirtiness within the storage portion 106. The judging unit 88 can judge whether the delivery of the package 74 to the storage portion 106 by the moving body 14 is possible, based on the dirtiness of the storage portion 106. If the inside of the storage portion 106 is extremely dirty due to mud or the like, there is a high possibility that the package 74 will be contaminated by the mud or the like. Accordingly, if the dirtiness within the storage portion 106 is greater than or equal to a dirtiness threshold value, the judging unit 88 can judge that the delivery of the package 74 to the storage portion 106 is impossible. On the other hand, if the inside of the storage portion 106 is not very dirty, there is a low possibility of the package 74 being contaminated. Accordingly, if the dirtiness within the storage portion 106 is less than or equal to the dirtiness threshold value, the judging unit 88 can judge that the delivery of the package 74 to the storage portion 106 is possible. The information concerning the dirtiness in the storage portion 106 can be acquired by the storage portion sensor 124 included in the vehicle 16. The control unit 89 included in the moving body 14 can make a request to the vehicle 16 to provide the information concerning the dirtiness in the storage portion 106. Here, an example is described of a case in which the information concerning the dirtiness in the storage portion 106 is acquired by the storage portion sensor 124 included in the vehicle 16, but the present invention is not limited to this. For example, the information concerning the dirtiness in the storage portion 106 can be acquired using the external environment sensor 67 included in the moving body 14, in a state where a door (not shown in the drawings) to the storage portion 106 is open.

The storage space information acquired by the storage space information acquiring unit 84 can include information concerning the degree of clutter within the storage portion 106. The judging unit 88 can judge whether the delivery of the package 74 to the storage portion 106 by the moving body 14 is possible, based on the degree of clutter in the storage portion 106. If the inside of the storage portion 106 is cluttered, there is a possibility that some kind of problem will occur when the package 74 is delivered to the inside of the storage portion 106. Accordingly, if the degree of clutter in the storage portion 106 is greater than or equal to a degree of clutter threshold value, the judging unit 88 can judge that the delivery of the package 74 to the storage portion 106 is impossible. On the other hand, if the inside of the storage portion 106 is not very cluttered, there is a low possibility that some kind of problem will occur. Accordingly, if the degree of clutter in the storage portion 106 is less than the degree of clutter threshold value, the judging unit 88 can judge that the delivery of the package 74 to the storage portion 106 is possible. The information concerning the degree of clutter in the storage portion 106 can be acquired by the storage portion sensor 124 included in the vehicle 16. The control unit 89 included in the moving body 14 can make a request to the vehicle 16 to provide the information concerning the degree of clutter in the storage portion 106. Here, an example is described of a case in which the information concerning the degree of clutter in the storage portion 106 is acquired by the storage portion sensor 124 included in the vehicle 16, but the present invention is not limited to this. For example, the information concerning the degree of clutter in the storage portion 106 can be acquired using the external environment sensor 67 included in the moving body 14, in a state where a door (not shown in the drawings) to the storage portion 106 is open.

The storage space information acquired by the storage space information acquiring unit 84 can include information concerning the flatness of the storage space in the storage portion 106. The judging unit 88 can judge whether the delivery of the package 74 to the storage portion 106 by the moving body 14 is possible, based on the flatness of the storage space in the storage portion 106. If the package 74 is loaded onto a stored item whose top surface is not flat, there is a possibility that some kind of problem will occur. Accordingly, in such a case, the judging unit 88 can judge that the delivery of the package 74 to the storage portion 106 is impossible. On the other hand, if the package 74 is loaded onto a stored item whose top surface is flat, there is a high possibility that no particular problem will occur. Accordingly, in such a case, the judging unit 88 can judge that the delivery of the package 74 to the storage portion 106 is possible. The information concerning the flatness of the storage space can be acquired by the storage portion sensor 124 included in the vehicle 16. The control unit 89 included in the moving body 14 can make a request to the vehicle 16 to provide the information concerning the flatness of the storage space. Here, an example is described of a case in which the information concerning the flatness of the storage portion 106 is acquired by the storage portion sensor 124 included in the vehicle 16, but the present invention is not limited to this. For example, the information concerning the flatness of the storage portion 106 can be acquired using the external environment sensor 67 included in the moving body 14, in a state where a door (not shown in the drawings) to the storage portion 106 is open.

The person information acquiring unit 86 acquires the person information, which is information concerning a person positioned in the space including the storage portion 106. The space including the storage portion 106 is the space around the storage portion 106, i.e. an area in the vicinity of the storage portion 106. For example, a space around the vehicle 16 in which the storage portion 106 is included can correspond to the space including the storage portion 106. Furthermore, as an example, the space around a delivery box installed in a parking lot of a shopping center (not shown in the drawings) is an example of the space including the storage portion 106. Here, an example is described of a case in which the storage portion 106 is included in the vehicle 16, but the present invention is not limited to this. If the storage portion 106 is included in the vehicle 16, the person information can be acquired by a person sensor (external environment sensor) 114 included in the vehicle 16. The control unit 89 included in the moving body 14 can make a request to the vehicle 16 to provide the person information. Here, an example is described of a case in which the person information is acquired by the person sensor 114 included in the vehicle 16, but the present invention is not limited to this. For example, the person information may be acquired using the external environment sensor 67 included in the moving body 14. Furthermore, the person sensor 114 may be formed by a monitoring sensor (monitoring camera) (not shown in the drawings) provided independently from the vehicle 16. The monitoring sensor can be attached to a building or the like, for example. The control unit 89 included in the moving body 14 can make a request to provide the person information to a server (not shown in the drawings) that acquires information using the monitoring sensor.

The judging unit 88 judges whether to limit the delivery of the package 74 to the storage portion 106 by the moving body 14, based on the person information acquired by the person information acquiring unit 86.

The person information acquired by the person information acquiring unit 86 can include information concerning whether a person is located in the space including the storage portion 106, more specifically, whether a person is located in the vicinity of the storage portion 106. The judging unit 88 can judge whether to limit the delivery of the package 74 to the storage portion 106 by the moving body 14, based on whether a person is located in the vicinity of the storage portion 106. For example, if a person is located in the vicinity of the storage portion 106, the judging unit 88 can judge that the delivery of the package 74 to the storage portion 106 is impossible. On the other hand, if there are no people located in the vicinity of the storage portion 106, the judging unit 88 can judge that the delivery of the package 74 to the storage portion 106 is possible.

The person information acquired by the person information acquiring unit 86 can include information concerning the orientation of the person. The judging unit 88 can judge whether to limit the delivery of the package 74 to the storage portion 106 by the moving body 14, based on the orientation of the person. For example, if the person is walking toward the storage portion 106, the judging unit 88 can judge that the delivery of the package 74 to the storage portion 106 is impossible. Essentially, if the orientation of the person is from the person toward the storage portion 106, the judging unit 88 suspends or stops the delivery of the package 74 to the storage portion 106 by the moving body 14. On the other hand, if the person is walking in a direction away from the storage portion 106, the judging unit 88 can judge that the delivery of the package 74 to the storage portion 106 is possible.

The person information acquired by the person information acquiring unit 86 can include information concerning the distance between the storage portion 106 and the person. The judging unit 88 can judge whether to limit the delivery of the package 74 to the storage portion 106 by the moving body 14, based on the distance between the storage portion 106 and the person. For example, if the distance between the storage portion 106 and the person is greater than or equal to a distance threshold value, the judging unit 88 can judge that the delivery of the package 74 to the storage portion 106 is possible. On the other hand, if the distance between the storage portion 106 and the person is less than the distance threshold value, the judging unit 88 can judge that the delivery of the package 74 to the storage portion 106 is impossible. Essentially, if the distance between the storage portion 106 and the person is less than the distance threshold value, the judging unit 88 suspends or stops the delivery of the package 74 to the storage portion 106 by the moving body 14.

The person information acquired by the person information acquiring unit 86 can include information concerning the walking velocity (movement velocity) of the person. The judging unit 88 can judge whether to limit the delivery of the package 74 to the storage portion 106 by the moving body 14, based on the walking velocity of the person. For example, if the walking velocity of the person is greater than or equal to a walking velocity threshold value (movement velocity threshold value), the judging unit 88 can judge that the delivery of the package 74 to the storage portion 106 is impossible. On the other hand, if the walking velocity of the person is less than walking velocity threshold value, the judging unit 88 can judge that the delivery of the package 74 to the storage portion 106 is possible.

The judging unit 88 can judge the time needed for the person to reach the storage portion 106, based on the information concerning the distance between the storage portion 106 and the person and the information concerning the walking velocity of the person. If the orientation of the person is a direction from the person toward the storage portion 106 and the time needed for the person to reach the storage portion 106 is less than the time needed for the delivery of the package 74 to the storage portion 106 by the moving body 14 to be completed, the judging unit 88 can perform a process such as shown below. Essentially, in such a case, the judging unit 88 can suspend or stop the delivery of the package 74 to the storage portion 106 by the moving body 14.

If any one of the distance between the storage portion 106 and the person, the movement velocity of the person, and the orientation of the person has changed during the delivery of the package 74 by the moving body 14, the judging unit 88 judges whether it is possible to continue the delivery of the package 74 by the moving body 14.

The control unit 89 can perform prescribed control, according to the judgment results of the judging unit 88. For example, if the judging unit 88 has judged that the delivery of the package 74 to the storage portion 106 is possible, the control unit 89 performs the delivery of the package 74 to the storage portion 106. On the other hand, if the judging unit 88 has judged that the delivery of the package 74 to the storage portion 106 is impossible, the control unit 89 does not perform the delivery of the package 74 to the storage portion 106.

The drive apparatus 52 includes a plurality of probes (not shown in the drawings) and a plurality of probe actuators (not shown in the drawings). Each probe actuator includes an electric motor, for example. The control unit 89 can control the movements of the moving body 14 by performing prescribed control of the drive apparatus 52.

The water damage prevention mechanism 54 can implement waterproofing measures for the package 74. Specifically, the water damage prevention mechanism 54 can prevent raindrops from reaching the package 74 by using rain repellant or the like (not shown in the drawings).

The holding mechanism (catcher) 55 has a function for gripping the package 74. The holding mechanism 55 further has a function for measuring the weight of the package 74. The holding mechanism 55 further has a function for measuring the size of the package 74.

The vehicle 16 includes a communicating apparatus (communicating unit) 90, a sensor group 92, a vehicle control apparatus 94, a drive apparatus 96, a brake apparatus 98, a steering apparatus 100, an ignition switch 102, an opening/closing mechanism 104, and the storage portion 106. The vehicle 16 can include other configurational elements, but descriptions thereof are omitted here.

The communicating unit 90 includes a telephone network communicating unit 108, the short-range wireless communicating unit 110, and the wireless LAN communicating unit 112. The telephone network communicating unit 108 includes a communication module (not shown in the drawings) that can be adapted to a mobile telephone network. The telephone network communicating unit 108 can communicate via a telephone network. The short-range wireless communicating unit 110 includes a short-range wireless communication module (not shown in the drawings). A communication module adapted to the Bluetooth (Registered Trademark) standard, for example, can be used as the short-range wireless communication module. The short-range wireless communicating unit 110 can perform short-range wireless communication with the short-range wireless communicating unit 58 included in the moving body 14. The wireless LAN communicating unit 112 includes a wireless LAN module (not shown in the drawings). A module adapted to the Wi-Fi (Registered Trademark) standard, for example, can be used as the wireless LAN module. The wireless LAN communicating unit 112 can perform wireless communication with the wireless LAN communicating unit 60 included in the moving body 14.

The sensor group 92 can include the person sensor 114, a GNSS sensor 116, the raindrop sensor 118, a velocity sensor 120, a gear position sensor 122, a storage portion sensor 124, and a humidity sensor 126.

The person sensor (external environment sensor) 114 can include a radar 128, a camera 130, and an ultrasonic wave sensor 132.

The radar 128 emits a transmission wave toward a target object and receives a reflected wave resulting from the target object reflecting back the emitted transmission wave. The transmission wave is an electromagnetic wave or the like, for example. The electromagnetic wave is a millimeter wave or the like, for example. The target object is a person or the like, for example, but is not limited to this. The radar 128 generates radar information (reflected wave signal) based on the reflected wave and the like. The radar 128 supplies the vehicle control apparatus 94 with the generated radar information. One radar 128 is shown in FIG. 1, but the vehicle 16 actually includes a plurality of radars 128. The radar 128 is not limited to being a millimeter wave radar. For example, a laser radar or the like may be used as the radar 128.

The camera 130 can capture an image of the surroundings of the vehicle 16. The information acquired by the camera 130, i.e. the camera information, is supplied from the camera 130 to the vehicle control apparatus 94. The camera information can include imaging information, specifically a moving image, a still image, and the like. One camera 130 is shown in FIG. 1, but a plurality of cameras 130 are actually included. The orientation of the camera 130 can be adjusted by an actuator (not shown in the drawings).

The ultrasonic wave sensor 132 emits an ultrasonic wave toward the target object, and receives a reflected wave resulting from the target object reflecting back the emitted transmission wave. The ultrasonic wave sensor 132 can detect the presence or lack of a target object, the distance to the target object, and the like. The ultrasonic wave sensor 132 generates ultrasonic wave sensor information based on the reflected wave and the like. The ultrasonic wave sensor 132 supplies the generated ultrasonic wave sensor information to the vehicle control apparatus 94. One ultrasonic wave sensor 132 is shown in FIG. 1, but the vehicle 16 actually includes a plurality of ultrasonic wave sensors 132.

The external environment information can be formed by the radar information acquired by the radar 128, the camera information acquired by the camera 130, and the ultrasonic wave sensor information acquired by the ultrasonic wave sensor 132, but is not limited to this.

The GNSS sensor 116 can detect the current position of the vehicle 16. The information acquired by the GNSS sensor 116, i.e. the information indicating the current position of the vehicle 16 (vehicle position information), can be supplied to the vehicle control apparatus 94.

The raindrop sensor 118 can detect the presence or lack of raindrops and output a signal indicating the detection result. A raindrop sensor that detects the presence or lack of raindrops by detecting a change in electrostatic capacitance caused by raindrops falling between a pair of electrodes, for example, can be used as the raindrop sensor 118, but the raindrop sensor 118 is not limited to this. The information acquired by the raindrop sensor 118 can be supplied to the vehicle control apparatus 94.

The velocity sensor (vehicle velocity sensor) 120 can detect the velocity of the vehicle 16, i.e. the vehicle velocity. The information acquired by the velocity sensor 120 can be supplied to the vehicle control apparatus 94.

The gear position sensor (shift position sensor) 122 detects the content of a manipulation performed by a user using a shift lever (selection lever or selector) (not shown in the drawings), and outputs the detected manipulation content to the vehicle control apparatus 94. Essentially, the gear position sensor 122 detects the shift position of the shift lever and outputs the detected shift position to the vehicle control apparatus 94. The shift lever has a plurality of shift positions. Specifically, the shift lever has a shift position for causing the vehicle 16 to move forward, i.e. a D range. Furthermore, the shift lever also has a shift position for causing the vehicle 16 to move backward, i.e. an R range. The shift lever also has an L range and an N range. The shift lever has a P range used when parking the vehicle. Here, an example is described of a case in which the shift position of the shift lever is detected, but the present invention is not limited to this. For example, in a case where a P button is used when parking the vehicle, a detection concerning whether this P button has been pressed may be performed.

The storage portion sensor 124 can detect an item stored in the storage portion 106, i.e. a stored item. The storage portion sensor 124 is included inside the storage portion 106, for example, but the present invention is not limited to this. A camera capable of acquiring three-dimensional information (in-vehicle camera), a pressure sensor provided on a floor surface in the vehicle compartment (not shown in the drawings), or the like, for example, can be used as the storage portion sensor 124. An image of the inside of the storage portion 106 can be captured by the storage portion sensor 124 while the inside of the storage portion 106 is being illuminated by the illumination apparatus (not shown in the drawings). The information acquired by the storage portion sensor 124 can be supplied to the vehicle control apparatus 94.

The humidity sensor 126 can detect the humidity in the storage portion 106. The information acquired by the humidity sensor 126 can be supplied to the vehicle control apparatus 94.

The vehicle control apparatus 94 includes a computing unit 136 and a storage unit 138. The computing unit 136 includes a judging unit 134 and a control unit 137. The judging unit 134 and the control unit 137 can be realized by having the computing unit 136 execute the programs stored in the storage unit 138.

The control unit 137 performs overall control of the vehicle 16, and performs prescribed control. The control unit 137 performs vehicle control by controlling each section based on the programs stored in the storage unit 138. The computing unit 136 can be formed by a CPU, an ASIC, or the like, for example.

The judging unit 134 can sense a person located in a space including the storage portion 106, based on the external environment information acquired by the person sensor 114. Specifically, the judging unit 134 can judge whether a person is located in the vicinity of the storage portion 106. Furthermore, the judging unit 134 can judge the orientation of the person relative to the storage portion 106, based on the external environment information acquired by the person sensor 114. The judging unit 134 can judge the distance between the storage portion 106 and the person, based on the external environment information acquired by the person sensor 114. The judging unit 134 can judge the walking velocity of the person, based on the external environment information acquired by the person sensor 114. The person information is generated according to such judgments made by the judging unit 134. The person information can include information indicating whether or not the person is located in the vicinity or the storage portion 106. The person information can include information indicating the orientation of the person relative to the storage portion 106. The person information can include information indicating the distance between the storage portion 106 and the person. The person information can include information indicating the walking velocity of the person.

The storage unit 138 includes a volatile memory (not shown in the drawings) and a non-volatile memory (not shown in the drawings). The volatile memory is a RAM or the like, for example. The non-volatile memory is a ROM, a flash memory, or the like, for example. The weather information, attribute information, storage space information, person information, and the like are stored in the volatile memory, for example. Programs, tables, maps, and the like are stored in the non-volatile memory, for example.

The drive apparatus (drive force control system) 96 includes a drive ECU (not shown in the drawings) and a drive source (not shown in the drawings). The drive ECU controls the drive force (torque) of the vehicle 16 by controlling the drive source. An engine, drive motor, or the like is used as the drive source, for example. The drive ECU can control the drive force by controlling the drive source, based on a manipulation of an acceleration pedal made by the user. The drive ECU can control the drive force by controlling the drive source, based on a command supplied from the vehicle control apparatus 94. The drive force of the drive source is transmitted to the vehicle wheels (not shown in the drawings), via a transmission or the like (not shown in the drawings).

The brake apparatus (brake force control system) 98 includes a brake ECU (not shown in the drawings) and a brake mechanism (not shown in the drawings). The brake mechanism causes a brake member to operate using a brake motor, a hydraulic mechanism, or the like. The brake ECU is capable of controlling the brake force by controlling the brake mechanism based on the operation made by the user with respect to the brake pedal. The brake ECU can control the brake force by controlling the brake mechanism, based on a command supplied from the vehicle control apparatus 94.

The steering apparatus (steering system) 100 includes a steering ECU (not shown in the drawings), i.e. an EPS (Electric Power Steering) system ECU, and a steering motor (not shown in the drawings). The steering ECU controls the orientation of the vehicle wheels (steered wheels) by controlling the steering motor, based on a manipulation of a steering wheel (not shown in the drawings) made by the user. The steering ECU controls the orientation of the vehicle wheels by controlling the steering motor, based on a command supplied from the vehicle control apparatus 94. The steering may be performed by changing the torque distribution or brake force distribution for the left and right vehicle wheels.

The ignition switch (main switch) 102 is a switch for the main power source of the vehicle 16. A signal indicating whether the ignition switch 102 is in the ON state can be supplied from the ignition switch 102 to the vehicle control apparatus 94.

The opening/closing mechanism 104 is a component for opening and closing a door (not shown in the drawings) of the storage portion 106. The opening/closing mechanism 104 can be controlled by the vehicle control apparatus 94.

The storage portion 106 is a trunk (not shown in the drawings) included in the vehicle 16, for example, but is not limited to this. For example, the compartment of the vehicle 16 may be the storage portion 106.

Figure 2:
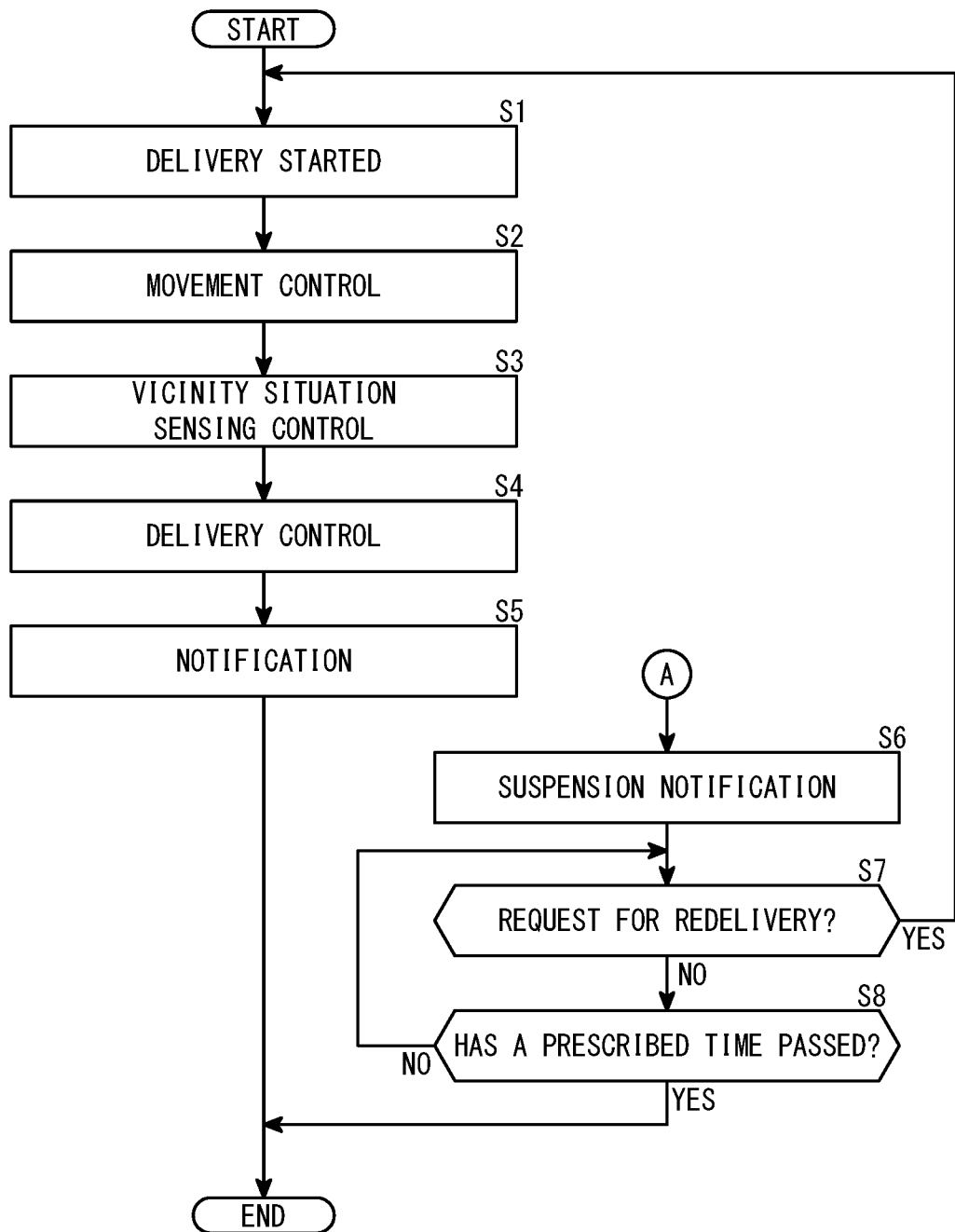
FIG. 2 is a flow chart showing an example of an operation of a delivery system according to an embodiment.

FIG. 2 is a flow chart showing an example of an operation of a delivery system according to the present embodiment.

Before step S1 is performed, the ordering of a product, the reception of the product order, the preparation for the delivery of the package 74 including this product, and the like are completed. Furthermore, before step S1 is performed, the possibility of the delivery of the package 74 to the delivery destination may be judged based on the weather information.

At step S1, the delivery is started. Specifically, the server 12 transmits a command for starting the delivery of the package 74, to the moving body 14. The control unit 89 included in the moving body 14 performs control to grip the package 74 with the holding mechanism 55. The control unit 89 causes the moving body 14 to start moving (flying) by controlling the drive apparatus 52 and the like. The moving body 14 moves from the delivery source to the delivery destination. Here, an example is described of a case in which the delivery destination is the vehicle 16, but the present invention is not limited to this. The server 12 notifies the vehicle 16 that the delivery of the package 74 by the moving body 14 has started. This notification may also be provided to the user terminal 18. The control unit 89 transmits the information concerning the package 74 to be delivered, to the vehicle 16. After this, the process moves to step S2.

At step S2, movement control (flying control or delivery control) is performed. Specifically, the control unit 89 included in the moving body 14 causes the moving body 14 to move toward the delivery destination, based on the delivery route determined in advance by the server 12. In this way, the moving body 14 reaches the delivery destination. The details of the movement control are described further below using FIG. 3. When step S2 has been completed, the process moves to step S3.

At step S3, control for the sensing of the situation in the vicinity of the storage portion 106, that is, vicinity situation sensing control, is performed. The delivery of the package 74 to the storage portion 106 is limited according to the situation in the vicinity of the storage portion 106. The details of the vicinity situation sensing control are described below using FIG. 4. When step S3 has been completed, the process moves to step S4.

At step S4, the control of the delivery of the package 74 to the storage portion 106, i.e. the delivery control, is performed. The details of the delivery control are described further below using FIG. 5. When step S4 has been completed, the process moves to step S5.

At step S5, the control unit 89 included in the moving body 14 provides notification that the delivery of the package 74 to the storage portion 106 has been completed. This notification can be made to the vehicle 16 from the moving body 14, for example, but the present invention is not limited to this. For example, this notification may be made from the moving body 14 to the server 12. Alternatively, this notification may be made from the moving body 14 to the user terminal 18.

In a case where the delivery of the package 74 to the storage portion 106 is not performed, at step S6, a notification that the delivery of the package 74 has been suspended without the package 74 being delivered to the storage portion 106 is provided. This notification is made from the moving body 14 to the vehicle 16, for example, but the present invention is not limited to this. For example, this notification may be made from the moving body 14 to the server 12. Alternatively, this notification may be made from the moving body 14 to the user terminal 18. After this, the process moves to step S7. The moving body 14 brings the package 74 back to the delivery source, e.g. the warehouse, without delivering the package 74 to the storage portion 106.

At step S7, the control unit 89 included in the moving body 14 judges whether redelivery has been requested. The redelivery request can be performed by having the user manipulate the user terminal 18, for example. The redelivery request is received by the server 12. If a redelivery request is received, the server 12 sends a redelivery command to the moving body 14. If redelivery has been requested (YES at step S7), the processes from step S1 are repeated. If redelivery has not been requested (NO at step S7), the process moves to step S8.

At step S8, the control unit 89 included in the moving body 14 judges whether a prescribed time has passed. If the prescribed time has not passed (NO of step S8), step S7 is repeated. If the prescribed time has passed (YES at step S8), the process shown in FIG. 2 is finished.

Figure 3:
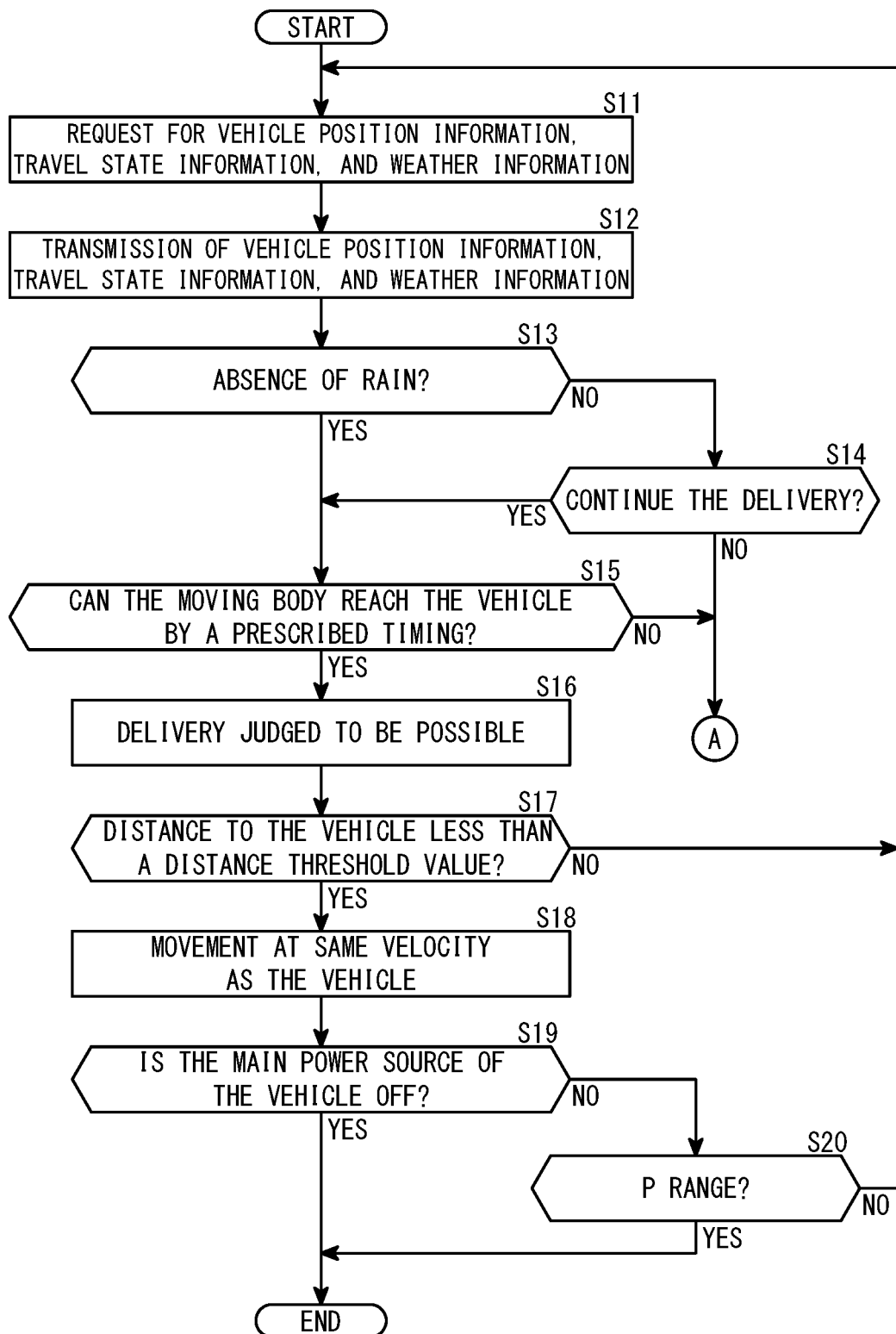
FIG. 3 is a flow chart showing an example of an operation of a delivery system according to an embodiment.

FIG. 3 is a flow chart showing an example of an operation of the delivery system according to the present embodiment. FIG. 3 shows an example of movement control.

At step S11, the control unit 89 included in the moving body 14 makes a request to the vehicle 16 for the vehicle position information, travel state information, and the weather information. As described above, the vehicle position information is information indicating the current position of the vehicle 16. The travel state information is information indicating a travel state of the vehicle 16. The weather information is information indicating the weather at the location of the vehicle 16. More specifically, the weather information is information indicating whether the weather is rainy.

At step S12, the control unit 137 included in the vehicle 16 transmits the vehicle position information, the travel state information, and the weather information to the moving body control apparatus 50 included in the moving body 14. In this way, the weather information acquiring unit 80 included in the moving body 14 acquires the weather information. Here, an example is described of a case in which the weather at the location of the vehicle 16 is judged based on the weather information supplied from the vehicle 16, but the present invention is not limited to this. For example, the weather at the location of the vehicle 16 may be judged based on the meteorological information and the vehicle position information.

At step S13, the judging unit 88 included in the moving body 14 judges whether it is raining at the location of the vehicle 16, based on the weather information acquired by the weather information acquiring unit 80. If it is not raining at the location of the vehicle 16 (YES at step S13), the process moves to step S15. If it is raining at the location of the vehicle 16 (NO at step S13), the process moves to step S14.

At step S14, the judging unit 88 included in the moving body 14 judges whether to continue the delivery. For example, if the package 74 is waterproof or the like, it is possible to continue the delivery of the package 74 even when it is raining. If the delivery of the package 74 is to be continued (YES at step S14), the process moves to step S15. If the delivery of the package 74 is not to be continued (NO at step S14), the process moves to step S6 (see FIG. 2).

At step S15, the judging unit 88 included in the moving body 14 judges whether the moving body 14 is to follow the vehicle 16 until a prescribed timing, which is a delivery limit. The computing unit 76 judges whether the moving body 14 is to follow the vehicle 16 until the prescribed timing, based on the vehicle position information indicating the position of the vehicle 16, the travel state information indicating the travel state of the vehicle 16, the movement velocity of the moving body 14, and the like. If the moving body 14 can catch up to the vehicle 16 by the prescribed timing (YES at step S15), the process moves to step S16. If the moving body 14 cannot catch up to the vehicle 16 by the prescribed timing (NO at step S15), the process moves to step S6 (see FIG. 2).

At step S16, the judging unit 88 included in the moving body 14 judges whether the delivery of the package 74 to the delivery destination is possible. In this case, the control unit 89 causes the moving body 14 to continue moving toward the delivery destination. After this, the process moves to step S17.

At step S17, the judging unit 88 included in the moving body 14 judges whether the distance from the moving body 14 to the vehicle 16 is less than the distance threshold value. The judging unit 88 can judge whether the distance from the moving body 14 to the vehicle 16 is less than the distance threshold value based on the vehicle position information indicating the current position of the vehicle 16 and the moving body position information indicating the current position of the moving body 14. The judging unit 88 may judge whether the distance from the moving body 14 to the vehicle 16 is less than the distance threshold value based on the external environment information acquired by the external environment sensor 67 included in the moving body 14. If the distance from the moving body 14 to the vehicle 16 is less than the distance threshold value (YES at step S17), the process moves to step S18. If the distance from the moving body 14 to the vehicle 16 is greater than or equal to the distance threshold value (NO at step S17), the process returns to step S11.

At step S18, the control unit 89 included in the moving body 14 causes the moving body 14 to move at a velocity equal to the travel velocity of the vehicle 16. After this, the process moves to step S19.

At step S19, the judging unit 134 included in the vehicle 16 judges whether the main power source of the vehicle 16 is OFF, i.e. whether the ignition switch 102 is in the OFF state. The control unit 137 transmits the information indicating the judgment result of the judging unit 134 to the moving body 14. The control unit 89 included in the moving body 14 can judge whether the vehicle 16 is stopped, based on such information. If the main power source of the vehicle 16 is OFF (YES at step S19), the process shown in FIG. 3 is finished. If the main power source of the vehicle 16 is ON (NO of step S19), the process moves to step S20.

At step S20, the judging unit 134 included in the vehicle 16 judges whether the shift position of the shift lever is in the P range. The control unit 137 transmits the information indicating the judgment result of the judging unit 134 to the moving body 14. The control unit 89 included in the moving body 14 can judge whether the vehicle 16 is stopped, based on such information. If the shift position of the shift lever is not in the P range (NO of step S20), the process returns to step S11. If the shift position of the shift lever is in the P range (YES of step S20), the process shown in FIG. 3 is finished.

The movement control is performed in the manner described above.

Figure 4:
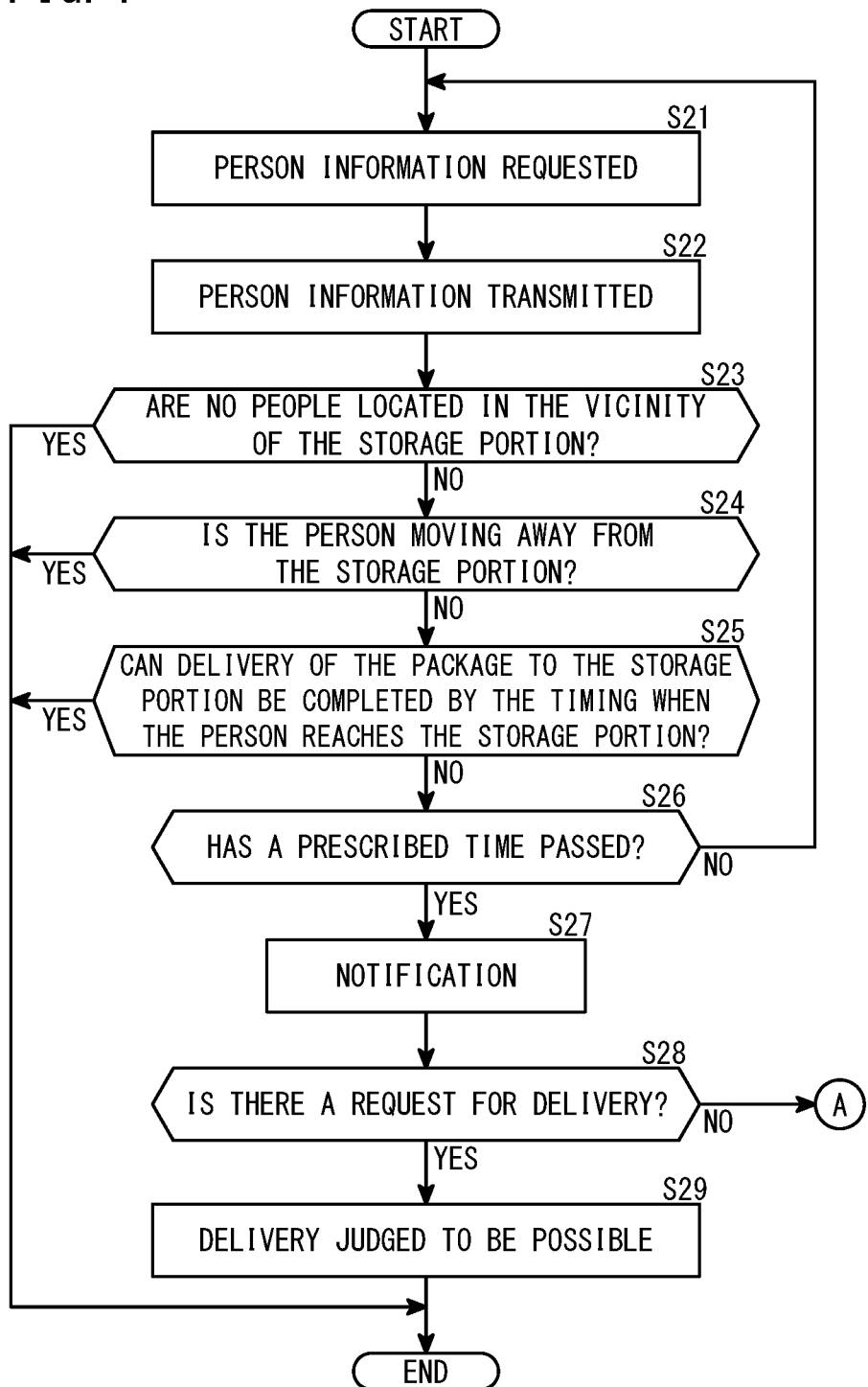
FIG. 4 is a flow chart showing an example of an operation of a delivery system according to an embodiment.

FIG. 4 is a flow chart showing an example of an operation of the delivery system according to the present embodiment. FIG. 4 shows an example of the vicinity situation sensing control. The vicinity situation sensing control can be performed to reduce the risk of theft or the like of the package 74 by a person in the vicinity of the storage portion 106, for example.

At step S21, the control unit 89 included in the moving body 14 makes a request to the vehicle 16 to provide the person information. As described above, the person information is information concerning a person located in the space including the storage portion 106. Here, an example is described of a case in which the person information is acquired by the person sensor 114 included in the vehicle 16, but the present invention is not limited to this. The person information may instead be acquired by the external environment sensor 67 included in the moving body 14. After this, the process moves to step S22.

At step S22, the control unit 137 included in the vehicle 16 transmits the person information to the moving body 14. As described above, the person information can include information indicating whether a person is located in the vicinity of the storage portion 106. Furthermore, as described above, the person information can include information indicating the orientation of the person relative to the storage portion 106. As described above, the person information can include information indicating the distance between the storage portion 106 and the person. As described above, the person information can include information indicating the walking velocity of the person. After this, the process moves to step S23.

At step S23, the judging unit 88 included in the moving body 14 judges whether a person is located in the vicinity of the storage portion 106, based on the person information. As described above, the person information can include information indicating whether a person is located in the vicinity of the storage portion 106. Therefore, the judging unit 88 can judge whether a person is located in the vicinity of the storage portion 106, based on this information. If a person is not located in the vicinity of the storage portion 106 (YES at step S23), the process shown in FIG. 4 is finished. If a person is located in the vicinity of the storage portion 106 (NO at step S23), the process moves to step S24.

At step S24, the judging unit 88 included in the moving body 14 judges whether the person is moving away from the storage portion 106. As described above, the person information can include information indicating the orientation of the person relative to the storage portion 106. As described above, the person information can include information indicating the walking velocity of the person. Therefore, the judging unit 88 can judge whether the person is moving away from the storage portion 106, based on these pieces of information. If the person is moving away from the storage portion 106 (YES at step S24), the process shown in FIG. 4 is finished. If the person is not moving away from the storage portion 106 (NO at step S24), the process moves to step S25.

At step S25, the judging unit 88 included in the moving body 14 judges whether the delivery of the package 74 to the storage portion 106 will be completed by the timing at which the person reaches the storage portion 106. As described above, the person information can include information concerning the orientation of the person relative to the storage portion 106. As described above, the person information can include information indicating the distance between the storage portion 106 and the person. As described above, the person information can include information indicating the walking velocity of the person. Therefore, the judging unit 88 can judge the time needed for the person to reach the storage portion 106, i.e. a first time. Furthermore, the judging unit 88 can judge the time needed for the moving body 14 to reach the storage portion 106, i.e. a second time, based on the moving body position information, the vehicle position information, and the movement velocity of the moving body 14. The judging unit 88 can judge the time needed for judging whether the delivery of the package 74 to the storage portion 106 is possible, i.e. a third time. The judging unit 88 can judge the time needed for the package 74 to be delivered to the storage portion 106, i.e. a fourth time. The sum of the second time, the third time, and the fourth time is the time needed for the delivery of the package 74 to the storage portion 106 to be completed. If the sum of the second time, the third time, and the fourth time is less than the first time, the judging unit 88 can judge that the delivery of the package 74 to the storage portion 106 will be completed by the timing at which the person reaches the storage portion 106. If the sum of the second time, the third time, and the fourth time is greater than or equal to the first time, the judging unit 88 can judge that the delivery of the package 74 to the storage portion 106 will not be completed by the time the person reaches the storage portion 106. The method for judging whether the delivery of the package 74 to the storage portion 106 will be completed by the timing at which the person reaches the storage portion 106 is not limited to the above. If the delivery of the package 74 to the storage portion 106 can be completed by the timing at which the person reaches the storage portion 106 (YES at step S25), the process shown in FIG. 4 is finished. If the delivery of the package 74 to the storage portion 106 cannot be completed by the timing at which the person reaches the storage portion 106 (NO at step S25), the process moves to step S26.

At step S26, the judging unit 88 included in the moving body 14 judges whether a prescribed time has passed from when the vicinity situation sensing control started. If the prescribed time has passed from when the vicinity situation sensing control started (YES at step S26), the process moves to step S27. If the prescribed time has not passed from when the vicinity situation sensing control started (NO step S26), the processes from step S21 are repeated.

At step S27, the control unit 89 included in the moving body 14 provides the vehicle 16 with notification that the delivery of the package 74 to the storage portion 106 is impossible. In such a case, the notification that the delivery of the package 74 to the storage portion 106 is impossible may be provided to the user terminal 18 from the control unit 137 included in the vehicle 16. Here, an example is described of a case in which this notification is provided to the vehicle 16 from the moving body 14, but the present invention is not limited to this. This notification may be provided to the user terminal 18 from the moving body 14. After this, the process moves to step S28.

At step S28, the control unit 89 included in the moving body 14 judges whether a request for the delivery of the package 74 to the storage portion 106 has been received. This request can be made by having the user manipulate the user terminal 18, for example. If the request for the delivery of the package 74 to the storage portion 106 has been received (YES at step S28), the process moves to step S29. If the request for the delivery of the package 74 to the storage portion 106 has not been received (NO at step S28), the process moves to step S6.

At step S29, the control unit 89 included in the moving body 14 judges that the delivery of the package 74 to the storage portion 106 is possible. When step S29 is completed, the process shown in FIG. 4 is finished.

The vicinity situation sensing control is performed in the manner described above.

Figure 5:
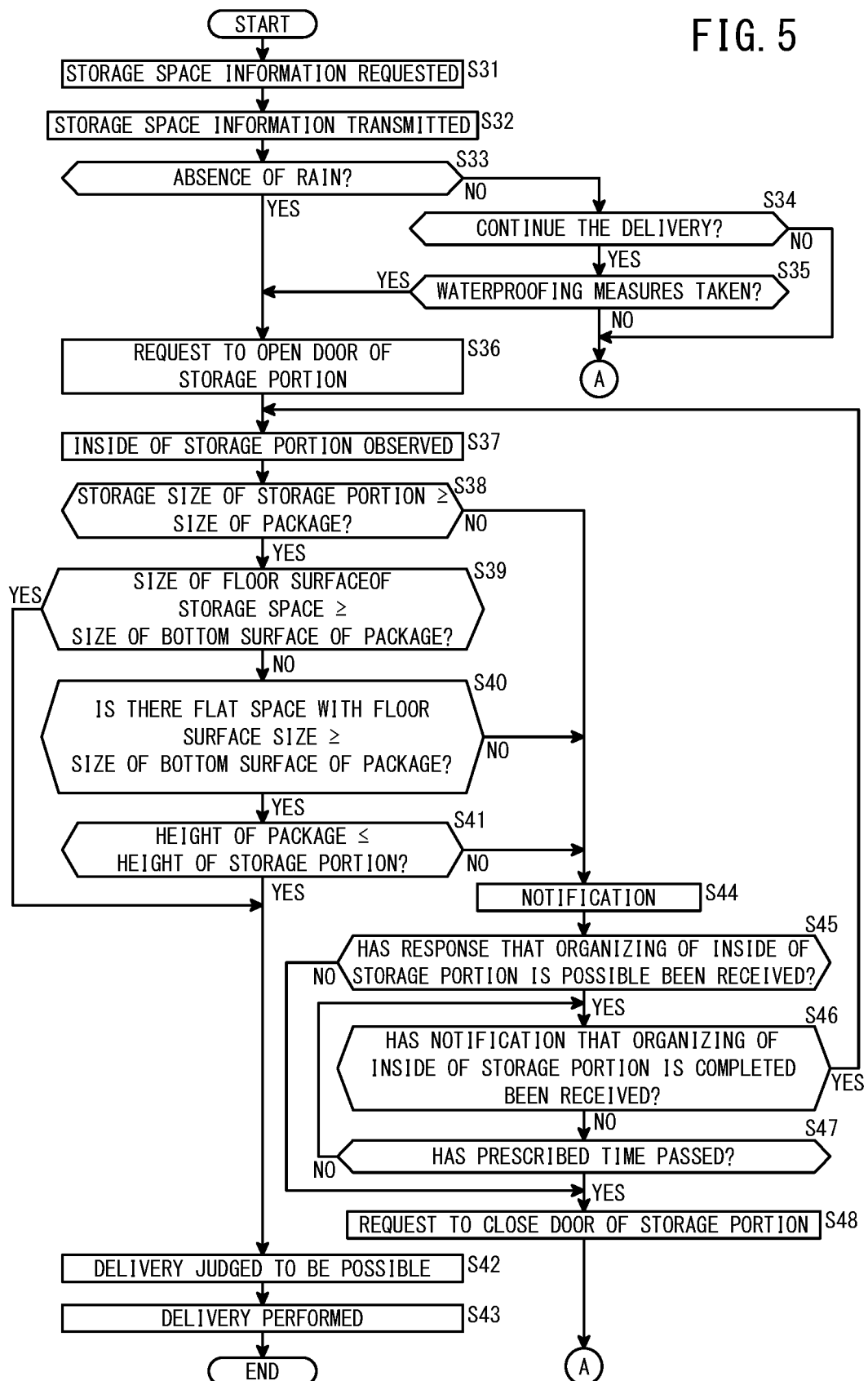
FIG. 5 is a flow chart showing an example of an operation of a delivery system according to an embodiment.

FIG. 5 is a flow chart showing an example of an operation of the delivery system according to the present embodiment. FIG. 5 shows an example of delivery control.

At step S31, the storage space information acquiring unit 84 included in the moving body 14 makes a request to the vehicle 16 to provide the information forming a portion of the storage space information. Specifically, the storage space information acquiring unit 84 makes a request to the vehicle 16 to provide information indicating the shape of the storage portion 106, the storage size of the storage portion 106, and the like. The storage space information acquiring unit 84 makes a request to the vehicle 16 to provide information indicating the presence or lack of stored items inside the storage portion 106. The storage space information acquiring unit 84 makes a request to the vehicle 16 to provide information concerning the presence or lack of waterproofing measures for the storage portion 106. The storage space information acquiring unit 84 makes a request to the vehicle 16 to provide information indicating the humidity in the storage portion 106, for example. The storage space information acquiring unit 84 makes a request to the vehicle 16 to provide information indicating the position of the storage portion 106 in the vehicle 16. After this, the process moves to step S32.

At step S32, the control unit 137 included in the vehicle 16 transmits the storage space information such as described above to the moving body 14. After this, the process moves to step S33.

At step S33, the judging unit 88 included in the moving body 14 judges whether it is raining at the location of the vehicle 16, based on the weather information acquired by the weather information acquiring unit 80. The weather information acquiring unit 80 can acquire the weather information using the raindrop sensor 118 included in the vehicle 16, for example, but the present invention is not limited to this. The weather information acquiring unit 80 may acquire the weather information using the raindrop sensor 70 included in the moving body 14. If it is not raining at the location of the vehicle 16 (YES at step S33), the process moves to step S36. If it is raining at the location of the vehicle 16 (NO at step S33), the process moves to step S34.

At step S34, the judging unit 88 included in the moving body 14 judges whether to continue the delivery of the package 74. For example, if the package 74 is waterproof or the like, it is possible to continue the delivery of the package 74 even if it is raining. If the delivery of the package 74 is to continue (YES at step S34), the process moves to step S35. If the delivery of the package 74 is not to continue (NO at step S34), the process moves to step S6 (see FIG. 2).

At step S35, the judging unit 88 included in the moving body 14 judges whether waterproofing measures have been implemented for the storage portion 106. As described above, the storage space information supplied from the vehicle 16 includes information concerning the presence or lack of waterproofing measures for the storage portion 106. Accordingly, the judging unit 88 can judge whether waterproofing measures have been implemented for the storage portion 106, based on this information. If waterproofing measures have been implemented for the storage portion 106 (YES at step S35), the process moves to step S36. If waterproofing measures have not been implemented for the storage portion 106 (NO at step S35), the process moves to step S6 (see FIG. 2).

At step S36, the control unit 89 included in the moving body 14 makes a request to the vehicle 16 to open a door of the storage portion 106. The control unit 137 included in the vehicle 16 opens the door of the storage portion 106 by controlling the opening/closing mechanism 104.

At step S37, the control unit 89 included in the moving body 14 performs control causing the moving body 14 to observe the inside of the storage portion 106. Specifically, the control unit 89 causes the moving body 14 to be located at a position where it is possible to observe the inside of the storage portion 106. The control unit 89 causes the external environment sensor 67 to acquire an image of the inside of the storage portion 106. Such information acquired by the external environment sensor 67 forms a portion of the storage space information. The information indicative of the inside of the storage portion 106 is thus acquired by the storage space information acquiring unit 84. Here, an example is described of a case in which the state inside the storage portion 106 is observed by the external environment sensor 67 included in the moving body 14, but the present invention is not limited to this. For example, the state inside the moving body 14 may be observed by the storage portion sensor 124 included in the vehicle 16. After this, the process moves to step S38.

At step S38, the judging unit 88 included in the moving body 14 judges whether the storage size of the storage portion 106 is greater than or equal to the size of the package 74. If the storage size of the storage portion 106 is greater than or equal to the size of the package 74 (YES at step S38), the process moves to step S39. If storage size of the storage portion 106 is less than the size of the package 74 (NO at step S38), the process moves to step S43. The information concerning the storage size of the storage portion 106 can be supplied to the moving body 14 from the vehicle 16, as described above.

At step S39, the judging unit 88 included in the moving body 14 judges whether the size of a floor surface of the storage space (empty space) is greater than or equal to the size of a bottom surface of the package 74. If the size of the floor surface of the storage space is greater than or equal to the size of the bottom surface of the package 74 (YES at step S39), the process moves to step S41. If the size of the floor surface of the storage space is less than the size of the bottom surface of the package 74 (NO at step S39), the process moves to step S40.

At step S40, the judging unit 88 included in the moving body 14 judges whether a flat space is present in the storage portion 106 and whether the size of the floor surface of this space is greater than or equal to the size of the bottom surface of the package 74. If a stored item with a flat top surface is already stored in the storage portion 106, the space on the stored item can correspond to this flat space. If a flat space is present in the storage portion 106 and the size of the floor surface of this space is greater than or equal to the size of the bottom surface of the package 74 (YES at step S40), the process moves to step S41. If there is no flat space in the storage portion 106 (NO at step S40), the process moves to step S44. If there is a flat space in the storage portion 106 but the size of the floor surface of this space is less than the size of the bottom surface of the package 74 (NO at step S40), the process moves to step S44.

At step S41, the judging unit 88 included in the moving body 14 judges whether the height of the package 74 is less than or equal to the height of the storage portion 106. Essentially, the judging unit 88 included in the moving body 14 judges whether the position of the top end (top surface) of the package 74 is lower than the position of the top end of the storage portion 106. If the height of the package 74 is less than or equal to the height of the storage portion 106 (YES at step S41), the process moves to step S42. If the height of the package 74 is greater than the height of the storage portion 106 (NO at step S41), the process moves to step S44.

At step S42, the judging unit 88 included in the moving body 14 judges that the delivery of the package 74 to the storage portion 106 is possible. After this, the process moves to step S43.

At step S43, the control unit 89 included in the moving body 14 performs the delivery of the package 74 to the storage portion 106. When step S43 has been completed, the process shown in FIG. 5 is finished.

At step S44, the judging unit 88 included in the moving body 14 judges that the delivery of the package 74 to the storage portion 106 is impossible. The control unit 89 included in the moving body 14 provides the vehicle 16 with notification that the delivery of the package 74 to the storage portion 106 is impossible. In such a case, the notification that the delivery of the package 74 to the storage portion 106 is impossible may be provided to the user terminal 18 from the control unit 137 included in the vehicle 16. Here, an example is described of a case in which this notification is provided to the vehicle 16 from the moving body 14, but the present invention is not limited to this. This notification may be provided to the user terminal 18 from the moving body 14. The control unit 89 included in the moving body 14 may provide the notification described above, and also provide notification indicating the reason why the delivery of the package 74 to the storage portion 106 is impossible.

At step S45, the judging unit 88 included in the moving body 14 judges whether a response that the inside of the storage portion 106 can be organized has been received from the notification destination. If the response that the inside of the storage portion 106 can be organized has been received from the notification destination (YES at step S45), the process moves to step S46. If the response that the inside of the storage portion 106 can be organized has not been received from the notification destination (NO at step S45), the process moves to step S48.

At step S46, the judging unit 88 included in the moving body 14 judges whether a notification indicating that the organization inside the storage portion 106 has been completed has been received from the notification destination. The organization of the inside of the storage portion 106 is performed by a passenger or the like of the vehicle 16, for example. If the notification indicating that the organization inside the storage portion 106 has been completed has been received from the notification destination (YES at step S46), the processes from step S37 are repeated. If the notification indicating that the organization inside the storage portion 106 has been completed has not been received from the notification destination (NO at step S46), the process moves to step S47.

At step S47, the judging unit 88 included in the moving body 14 judges whether a prescribed time has passed from when the notification that the delivery of the package 74 to the storage portion 106 is impossible was provided. If the prescribed time has passed from when the notification that the delivery of the package 74 to the storage portion 106 is impossible was provided (YES at step S47), the process moves to step S48. If the prescribed time has not passed from when the notification that the delivery of the package 74 to the storage portion 106 is impossible was provided (NO at step S47), the process of step S46 is performed again.

At step S48, the control unit 89 included in the moving body 14 makes a request to the vehicle 16 to close the door of the storage portion 106. The control unit 137 included in the vehicle 16 closes the door of the storage portion 106 by controlling the opening/closing mechanism 104. After this, the process moves to step S6.

The delivery control is performed in the manner described above.

In this way, according to the present embodiment, the weather information including the information concerning the weather at the delivery destination is acquired, and a judgment concerning whether the delivery of the package 74 to the delivery destination by the moving body 14 is possible is made based on this weather information. If it is raining at the delivery destination, the delivery is suspended, and therefore it is possible to prevent the package 74 from getting wet from the rain. Therefore, according to the present embodiment, it is possible to provide a delivery system 10 that can favorably deliver the package 74 to the delivery destination.

[Modifications of the Embodiments]

The above describes preferred embodiments of the present invention, but the present invention is not limited to the above embodiments, and various modifications can be made without deviating from the scope of the present invention.

In the above embodiments, an example is described of a case in which the possibility of the delivery of the package 74 to the delivery destination is judged by the judging unit 88 included in the moving body 14, but the present invention is not limited to this. For example, the possibility of the delivery of the package 74 to the delivery destination may be judged by the server 12, the vehicle 16, or the user terminal 18.

In the above embodiments, an example is described of a case in which the possibility of the delivery of the package 74 to the storage portion 106 is judged by the judging unit 88 included in the moving body 14, but the present invention is not limited to this. For example, the possibility of the delivery of the package 74 to the storage portion 106 may be judged by the server 12, the vehicle 16, or the user terminal 18.

The following is a summary of the embodiments described above.

A delivery system (10) for delivering a package (74) to a delivery destination (16) using a moving body (14), comprising a weather information acquiring unit (80) that acquires weather information including information concerning weather at the delivery destination; and a judging unit (88) that judges whether delivery of the package to the delivery destination by the moving body is possible, based on the weather information acquired by the weather information acquiring unit. According to such a configuration, the weather information including the information concerning the weather at the delivery destination is acquired, and the possibility of the delivery of the package to the delivery destination by the moving body is judged based on this weather information. If it is raining at the delivery destination, the delivery is suspended, and therefore it is possible to prevent the package from getting wet due to the rain. Therefore, according to such a configuration, it is possible to provide a delivery system that can favorably deliver the package to the delivery destination.

The weather information may be acquired using a sensor included at the delivery destination.

The sensor may be a raindrop sensor (118).

The weather information may be acquired based on meteorological information and position information indicating a position of the delivery destination.

The weather information may further include information concerning weather along a delivery route. According to such a configuration, if it is not raining at the delivery destination but it is raining along the delivery route, the delivery is suspended, and therefore it is possible to more reliably prevent the package from getting wet due to rain. With such a configuration, it is possible to provide a delivery system that can more favorably deliver the package to the delivery destination.

The delivery system may further comprise an attribute information acquiring unit (82) that acquires attribute information, which is information concerning an attribute of the package, and the judging unit may judge whether delivery of the package by the moving body is possible, further based on the attribute information acquired by the attribute information acquiring unit. According to such a configuration, it is possible to judge whether the delivery of the package by the moving body based on an attribute of the package. Therefore, according to such a configuration, it is possible to provide a delivery system that can more favorably deliver the package to the delivery destination.

The attribute information may include information concerning waterproofing measures for the package, and the judging unit may judge whether delivery of the package by the moving body is possible, based on whether waterproofing measures have been implemented for the package. According to such a configuration, if waterproofing measures have been implemented for the packaging of the package, the package can be delivered even in the rain. According to such a configuration, it is possible to provide a delivery system that can more favorably deliver the package to the delivery destination.

If waterproofing measures are implemented for the package, the judging unit may perform the delivery of the package by the moving body.

The moving body may be an autonomous flying body.

The delivery destination may be a vehicle (16).

The delivery system may further comprise a storage portion information acquiring unit that acquires information concerning waterproofing measures for a storage portion included at the delivery destination.

A delivery method comprises a step (S11, S12) of acquiring weather information including information concerning weather at a delivery destination; and a step (S13) of judging whether delivery of a package to the delivery destination by a moving body is possible, based on the weather information.

A computer-readable non-transitory recording medium stores thereon a program that causes a computer to perform a step of acquiring weather information including information concerning weather at a delivery destination; and a step of judging whether delivery of a package to the delivery destination by a moving body is possible, based on the weather information.

What is claimed is:

1. A delivery system for delivering a package to a delivery destination using a moving body, the delivery system comprising: a user terminal configured to transmit order information, a server configured to instruct the moving body to deliver the package on a basis of the order information received from the user terminal, a vehicle configured to communicate with the server and the moving body, and one or more processors included in the user terminal, the server, the vehicle, or the moving body, wherein
the delivery destination is the vehicle, and
the one or more processors cause the delivery system to:
acquire weather information including information concerning weather at the delivery destination;
judge whether delivery of the package to the delivery destination by the moving body is possible, based on the weather information acquired; and
on a basis of a judgment that it is possible to deliver the package to the vehicle, move the moving body to the vehicle if a main power source of the vehicle is ON or a shift lever of the vehicle is not in a parking range and if the vehicle is present at a distance less than a distance threshold value from the moving body, the distance being obtained from the vehicle position information indicating a current position of the vehicle and moving body position information indicating a current position of the moving body.

2. The delivery system according to claim 1, wherein the weather information is acquired using a sensor included at the delivery destination.

3. The delivery system according to claim 2, wherein the sensor is a raindrop sensor.

4. The delivery system according to claim 1, wherein the weather information is acquired based on meteorological information and position information indicating a position of the delivery destination.

5. The delivery system according to claim 1, wherein the weather information further includes information concerning weather along a delivery route.

6. The delivery system according to claim 1, the one or more processors further acquire attribute information, which is information concerning an attribute of the package, wherein
the one or more processors judge whether delivery of the package by the moving body is possible, further based on the attribute information acquired.

7. The delivery system according to claim 6, wherein the attribute information includes information concerning waterproofing measures for the package, and
the one or more processors judge whether delivery of the package by the moving body is possible, based on whether waterproofing measures have been implemented for the package.

8. The delivery system according to claim 7, wherein if waterproofing measures are implemented for the package, the one or more processors judge the delivery of the package by the moving body as possible.

9. The delivery system according to claim 1, wherein the moving body is an autonomous flying body.

10. The delivery system according to claim 1, the one or more processors further acquire information concerning waterproofing measures for a storage portion included at the delivery destination.

11. A delivery method for delivering a package to a delivery destination using a moving body, a user terminal configured to transmit order information, a server configured to instruct the moving body to deliver the package on a basis of the order information received from the user terminal, and a vehicle that is the delivery destination and configured to communicate with the server and the moving body, the delivery method comprising:
a step of acquiring weather information including information concerning weather at a delivery destination;
a step of making a judgment whether delivery of the package to the delivery destination by the moving body is possible, based on the weather information; and
on a basis of the judgment that it is possible to deliver the package to the vehicle, a step of moving the moving body to the vehicle if a main power source of the vehicle is ON or a shift lever of the vehicle is not in a parking range and if the vehicle is present at a distance less than a distance threshold value from the moving body, the distance being obtained from the vehicle position information indicating a current position of the vehicle and moving body position information indicating a current position of the moving body.

12. A computer-readable non-transitory recording medium storing thereon a program that causes a computer to effectuate a delivery of a package to a delivery destination using a moving body, a user terminal configured to transmit order information, a server configured to instruct the moving body to deliver the package on a basis of the order information received from the user terminal, and a vehicle that is the delivery destination and configured to communicate with the server and the moving body, the program comprising:
- a step of acquiring weather information including information concerning weather at the delivery destination; and
- a step of making a judgment whether delivery of the package to the delivery destination by the moving body is possible, based on the weather information; and
- on a basis of the judgment that it is possible to deliver the package to the vehicle, a step of moving the moving body to the vehicle if a main power source of the vehicle is ON or a shift lever of the vehicle is not in a parking range and if the vehicle is present at a distance less than a distance threshold value from the moving body, the distance being obtained from the vehicle position information indicating a current position of the vehicle and moving body position information indicating a current position of the moving body.

* * * * *